(12) United States Patent
Xu et al.

(10) Patent No.: US 9,307,377 B2
(45) Date of Patent: Apr. 5, 2016

(54) METHOD, TERMINAL, AND SYSTEM FOR IMPLEMENTING CALL FORWARDING

(71) Applicant: Hytera Communications Corp., Ltd, Shenzhen, Guangdong (CN)

(72) Inventors: Yan Xu, Shenzhen (CN); Chia Han Siong Samuel, Shenzhen (CN); Yang Yu, Shenzhen (CN); Ruihua Yin, Shenzhen (CN); Fan Yang, Shenzhen (CN)

(73) Assignee: Hytera Communications Corp., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/654,889

(22) PCT Filed: Dec. 24, 2012

(86) PCT No.: PCT/CN2012/087306
§ 371 (c)(1),
(2) Date: Jun. 23, 2015

(87) PCT Pub. No.: WO2014/100940
PCT Pub. Date: Jul. 3, 2014

(65) Prior Publication Data
US 2016/0007172 A1 Jan. 7, 2016

(51) Int. Cl.
*H04W 4/16* (2009.01)
*H04M 3/54* (2006.01)
*H04M 3/42* (2006.01)

(52) U.S. Cl.
CPC *H04W 4/16* (2013.01); *H04M 3/54* (2013.01); *H04M 3/42153* (2013.01)

(58) Field of Classification Search
CPC ...... H04M 3/42153; H04M 3/54; H04W 4/16
See application file for complete search history.

(56) References Cited

U.S. PATENT DOCUMENTS 8,971,867 B2 * 3/2015 Huang .................... H04W 4/16
455/414.1
2004/0057559 A1 * 3/2004 Lee .................... H04M 3/42314
379/56.1

(Continued)

FOREIGN PATENT DOCUMENTS

CN 1481135 A 3/2004
CN 101150631 A 3/2008

(Continued)

OTHER PUBLICATIONS

International Search Report dated Sep. 12, 2013 from corresponding International Application No. PCT/CN2012/087306.

*Primary Examiner* — Kashif Siddiqui
(74) *Attorney, Agent, or Firm* — Wolf, Greenfield & Sacks, P.C.

(57) ABSTRACT

A method, a terminal, and a system for implementing call diversion. The method comprises: when a call access anomaly of a request terminal occurs, setting and sending call forwarding request information to a target terminal; the target terminal reading a call forwarding identification in the call forwarding request information, determining whether the call forwarding identification is correct, and if yes, reading an address of the target terminal in the call forwarding request information; the target terminal determining whether the address of the target terminal is correct, and if yes, reading a forwarding address identification in the call forwarding request information, setting a forwarding terminal address according to the forwarding address identification, and setting and sending call forwarding success response information to the request terminal; and the request terminal receiving the call forwarding success response information and setting up call forwarding.

14 Claims, 11 Drawing Sheets

| LB | PF | CSBK | |
|----|----|------|---|
| MFID ||||
| G/I | OC | NOA | 0 |
| AC (Optional) ||||
| Address of target terminal ||||
| Address of requesting terminal ||||
| CRC ||||

(56) References Cited

U.S. PATENT DOCUMENTS

2007/0081653 A1* 4/2007 Hertelt .................... H04M 3/54
                                                    379/211.01
2012/0164999 A1* 6/2012 Chae ..................... H04L 63/105
                                                    455/418

FOREIGN PATENT DOCUMENTS

CN        101202937 A      6/2008
CN        101594597 A     12/2009

* cited by examiner

| LB | PF | CSBK ||
|---|---|---|---|
| MFID |||||
| G/I | OC | NOA | 0 |
| AC (Optional) ||||
| Address of target terminal ||||
| Address of requesting terminal ||||
| CRC ||||

Figure 3

| LB | PF | CSBK |
|----|----|------|
| MFID ||||
| Address of a first diverted terminal ||||
| Address of a second diverted terminal ||||
| Address of a third diverted terminal ||||
| 8_MSB of address of a fourth diverted terminal ||||

Figure 4

| LB | PF | CSBK |
|----|----|------|
| MFID ||||
| 16_LSB of the address of the fourth diverted terminal ||||
| address of the fifth diverted terminal ||||
| address of the sixth diverted terminal ||||
| CRC ||||

Figure 5

| LB | PF | CSBK |
|---|---|---|
| MFID ||| 
| RC |||
| Reserved information |||
| Address of requesting terminal |||
| Address of target terminal |||
| CRC |||

Figure 6

| 1 | 0 | 1 1 0 1 1 0 |
|---|---|---|
| MFID | | |

| 0 | 0 0 | 0 0 0 0 | 0 |
|---|---|---|---|

| AC (Optional) |
|---|
| Address of terminal B |
| Address of terminal A |
| CRC |

Figure 12

| 1 | 0 | 1 1 0 1 1 1 |
|---|---|---|
| MFID | | |

| 00000000 |
|---|
| Reserved information |
| Address of terminal A |
| Address of terminal B |
| CRC |

Figure 13

| 1 | 0 | 1 1 0 1 1 0 | |
|---|---|---|---|
| MFID | | | |
| 1 | 00 | 0 0 1 0 | 0 |
| AC (Optional) | | | |
| Address of terminal D | | | |
| Address of terminal C | | | |
| CRC | | | |

Figure 14

| 1 | 0 | 1 1 0 1 1 0 |
|---|---|---|
| MFID | | |
| Address of terminal E | | |
| Address of terminal F | | |
| All 0 | | |
| CRC | | |

Figure 15

| 1 | 0 | 1 1 0 1 1 1 |
|---|---|---|
| \multicolumn{3}{c|}{MFID} |
| \multicolumn{3}{c|}{00000000} |
| \multicolumn{3}{c|}{Reserved information} |
| \multicolumn{3}{c|}{Address of terminal C} |
| \multicolumn{3}{c|}{Address of terminal D} |
| \multicolumn{3}{c|}{CRC} |

Figure 16

METHOD, TERMINAL, AND SYSTEM FOR IMPLEMENTING CALL FORWARDING

This application is the national phase of International Application No. PCT/CN2012/087306, titled "METHOD, TERMINAL, AND SYSTEM FOR IMPLEMENTING CALL FORWARDING", filed on Dec. 24, 2012, which is hereby incorporated by reference in its entirety.

TECHNICAL FIELD

The disclosure relates to the field of communication technology, and in particular to a method, terminal, and system for implementing call diversion.

BACKGROUND

A trunked communication system is a radio mobile communication system in which multiple users share multiple channels via dynamic channel assignment. The system generally consists of mobile terminals and a dispatcher station, and has functions of dispatch, group call, priority call, etc. In a conventional trunked communication system, the dispatcher station is mainly responsible for dispatch and smart distribution of mobile terminals. When the mobile terminal is not able to access an incoming call, for example, when the mobile terminal is busy or the battery runs out, the dispatcher station forwards the call to the mobile terminal as needed.

After registering in the dispatcher station, the mobile terminal applies to the dispatcher station for call diversion; in response to an instruction from the dispatcher station for obtaining target address, the mobile terminal sends the target address to the dispatcher station; and the dispatcher station stores the received target address. A caller terminal requests to the dispatcher station calling the mobile terminal, and if the mobile terminal is not able to access the incoming call, for example, when the mobile terminal is busy or battery runs out, the dispatcher station sends the target address to the caller terminal, the caller terminal initiates a call to the target terminal, and the call diversion of mobile terminal is accomplished.

When using the above method to implement call diversion, those skilled in the art find the following drawbacks.

The mobile terminal sends the target address to the dispatcher station to establish call diversion setting, and when performing the call diversion, the dispatcher station sends the target address to the caller terminal to implement call diversion. The mobile terminal is passive in the process of call dispatch and distribution, and is controlled by the dispatcher station. In a conventional communications system without the dispatcher station, the mobile terminal can only implement basic call services and information transmission function, and cannot implement call diversion.

SUMMARY

In view of this, a method, a terminal, and a system for implementing call diversion are provided according to the embodiments of the disclosure, and the function of call diversion among mobile terminals is implemented without using a dispatcher station.

A method for implementing call diversion, includes:

setting, by a requesting terminal, a message requesting for call diversion and sending the message to a target terminal, in a case that the requesting terminal encounters abnormal call access;

reading, by the target terminal, an identifier of call diversion in the message requesting for call diversion, determining whether the identifier of call diversion is valid, and in case of positive determination, reading the address of the target terminal in the message requesting for call diversion;

determining, by the target terminal, whether the address of the target terminal is valid, and in case of positive determination, reading an identifier of diversion address in the message requesting of call diversion, setting an address of a diverting terminal based on the identifier of diversion address, setting a acknowledgement message of successful call diversion and sending the acknowledgement message to the requesting terminal; and receiving, by the requesting terminal, the acknowledgement message of successful call diversion, and establishing the call diversion.

Preferably, if the identifier of diversion address is an identifier of a source terminal, the setting the address of the diverting terminal based on the identifier of diverting address includes:

reading, by the target terminal, an address of the requesting terminal in the message requesting for call diversion; and setting the address of the requesting terminal as the address of the diverting terminal.

Preferably, if the identifier of diversion address is an identifier of a side terminal, the setting the address of the diverting terminal based on the identifier of diversion address includes:

reading, by the target terminal, an address of at least one diverted terminal in the message requesting for call diversion; and setting the address of at least one diverted terminal as the address of the diverting terminal.

Preferably, if the address of the target terminal is valid, the method further includes:

reading, by the target terminal, authorization information in the message requesting for call diversion, determining whether the authorization information is valid, and in case of positive determination, setting the address of the diverting terminal based on the identifier of diversion address, setting a acknowledgement message of successful call diversion and sending the acknowledgement message to the requesting terminal.

Preferably, after setting the message requesting for call diversion and sending the message to the target terminal, the method further includes:

timing, by the requesting terminal; and in a case that no acknowledgement message of successful call diversion is received after the timing exceeds a preset threshold, sending a trigger signal to trigger the resending of the message requesting for call diversion.

A method for implementing cancellation of call diversion, includes:

setting, by a requesting terminal, a message for canceling call diversion and sending the message to a target terminal, when the requesting terminal recovers to normal call access;

reading, by the target terminal, an identifier of diversion cancellation in the message for canceling call diversion, determining whether the identifier of diversion cancellation is valid, and in case of positive determination, reading the address of the target terminal in the message for canceling call diversion;

determining, by the target terminal, whether the address of the target terminal is valid, in case of positive determination, reading the identifier of cancellation address in the message for canceling call diversion, removing the address of the diverting terminal based on the identifier of cancellation address, setting a message of successful cancellation of call diversion and sending the message to the requesting terminal; and canceling, by the requesting terminal, the call diversion based on the message of successful cancellation of call diversion.

A requesting terminal for implementing call diversion, includes:

a module for setting requesting message, configured to set a message requesting for call diversion in case of abnormal call access;

a module for sending requesting message, configured to send the message requesting for call diversion to the target terminal, to allow the target terminal to read an identifier of call diversion in the message requesting for call diversion, determine whether the identifier of call diversion is valid, in case of positive determination, read an address of the target terminal in the message requesting for call diversion, determine whether the address of the target terminal is valid, in case of positive determination, read an identifier of diversion address in the message requesting of call diversion, set an address of a diverting terminal based on the identifier of diversion address, set a acknowledgement message of successful call diversion and send the acknowledgement message; and a module for receiving acknowledgement message, configured to receive a acknowledgement message of successful call diversion and establish the call diversion.

Preferably, the terminal further includes:

a timing module, configured for timing after setting the message requesting for call diversion and sending the message to the target terminal; where after the timing exceeds the preset threshold, to send a trigger signal to the module for sending requesting message, wherein the trigger signal triggers the module for sending requesting message to resend the message requesting for call diversion.

A target terminal for implementing call diversion, includes:

a module for receiving requesting message, configured to receive a message requesting for call diversion, wherein the message requesting for call diversion is set and sent by a requesting terminal in a case that the requesting terminal encounters abnormal call access;

a module for determining identifier of call diversion, configured to determine whether an identifier of call diversion is valid, wherein in case of positive determination, the address of the target terminal in the message requesting for call diversion is read;

a module for determining address of target terminal, configured to determine whether the address of the target terminal is valid, wherein in case of positive determination, the identifier of diversion address in the message requesting for call diversion is read;

a module for setting an address of a diverting terminal, configured to set the address of the diverting terminal based on the identifier of diversion address;

a module for setting acknowledgement message of diversion, configured to set a acknowledgement message of successful call diversion in a case that the address of the target terminal is valid; and a module for sending acknowledgement message of diversion, configured to send a acknowledgement message of successful diversion to the requesting terminal, to allow the requesting terminal to receive the acknowledgement message of successful call diversion and establish the call diversion.

Preferably, if the identifier of diversion address is an identifier of a source terminal, the module for setting the address of the diverting terminal includes:

a first module for address reading, configured to read the address of requesting terminal in the message requesting for call diversion; and a first module for address setting, configured to set the address of requesting terminal as the address of the diverting terminal.

Preferably, if the identifier of diversion address is an identifier of a side terminal, the module for setting address of the diverting terminal includes:

a second module for address reading, configured to read the address of at least one diverted terminal in the message requesting for call diversion; and a second module for address setting, configured to set the address of at least one diverted terminal as the address of the diverting terminal.

Preferably, the terminal further includes:

a module for determining authorization information, configured to read authorization information in the message requesting for call diversion in a case that the address of target is valid, determine whether the authorization information is valid, and in case of positive determination, set the address of the diverting terminal based on the identifier of diversion address; and a module for setting acknowledgement message of diversion, configured to set the acknowledgement message of successful call diversion in a case that the authorization information is valid.

A requesting terminal for implementing cancellation of call diversion, includes:

a module for setting cancellation message, configured to set a message for canceling call diversion when recovering to normal call access;

a module for sending cancellation message, configured to send the message for canceling call diversion to the target terminal, to allow the target terminal to read an identifier of diversion cancellation in the message for canceling call diversion, determine whether the identifier of diversion cancellation is valid, and in case of positive determination, read an address of a target terminal in the message for canceling call diversion, determine whether the address of the target terminal is valid, and in case of positive determination, read an identifier of address cancellation in the message for canceling call diversion, remove an address of a diverting terminal based on the identifier of address cancellation, and set and send a message of successful cancellation of call diversion; and a module for receiving message of successful cancellation, configured to cancel the call diversion based on the message of successful cancellation of call diversion.

A target terminal for implementing cancellation of call diversion, includes:

a module for receiving cancellation message, configured to receive a message for canceling call diversion, wherein the message for canceling call diversion is set and sent by the requesting terminal when the requesting terminal recovers to normal call access;

a module for determining identifier of diversion cancellation, configured to determine whether the identifier of diversion cancellation is valid, and in case of positive determination, address of the target terminal in the message for canceling call diversion is read;

a module for determining address, configured to determine whether the address of the target terminal is valid, and in case of positive determination, an identifier of cancellation address in the message for canceling call diversion is read;

a module for removing, configured to remove the address of the diverting terminal based on the identifier of cancellation address;

a module for setting a message of successful cancellation, configured to set a message of successful cancellation of call diversion in a case that the address of the target terminal is valid; and a module for sending message of successful cancellation, configured to send the message of successful cancellation of call diversion to the requesting terminal, to allow the requesting terminal to receive the message of successful cancellation of call diversion and cancel the call diversion.

A system for implementing call diversion, includes:

a requesting terminal in the disclosure, and a target terminal in the disclosure.

It may be learned from the above that, beneficial effects of the disclosure are as follows:

in the method for call diversion provided in the disclosure, the message requesting for call diversion is set and sent to the target terminal in a case that the requesting terminal encounters abnormal call access, the target terminal reads the identifier of call diversion in the message requesting for call diversion, determines whether the identifier of call diversion is valid, in case of positive determination, the address of the target terminal in the message requesting for call diversion is read, the target terminal determines whether the address of the target terminal is valid, in case of positive determination, the identifier of diversion address in the message requesting of call diversion is read, the address of the diverting terminal is set based on the identifier of diversion address, the acknowledgement message of successful call diversion is set and sent to the requesting terminal, and the requesting terminal receives the acknowledgement message of successful call diversion and establishes the call diversion; the requesting terminal sends the message requesting for call diversion to the target terminal directly, after verifying the validity of the message requesting for call diversion, the target terminal sets the address of the diverting terminal and the acknowledgement message of successful call diversion, sends the acknowledgement message of successful call diversion to the requesting terminal, and establishes the call diversion, where no dispatcher station is needed, and call diversion among terminals is realized.

BRIEF DESCRIPTION

The drawings, as part of the disclosure, are used to provide further understanding of the disclosure, and illustrate the disclosure in conjunction with the embodiments of the disclosure without limitation to the disclosure.

FIG. 3 is a structure diagram of the protocol data frame requesting for call diversion;

FIG. 4 is a structure diagram of a protocol data unit of a middle block in a protocol data frame for carrying a message of call diversion;

FIG. 5 is a structure diagram of a protocol data unit of a last block in a protocol data frame for carrying a message of call diversion;

FIG. 6 is a structure diagram of a protocol data frame for call diversion acknowledgement;

FIG. 12 is a structure diagram of a protocol data frame requesting for call diversion according to Example 1 of the disclosure;

FIG. 13 is a structure diagram of a protocol data frame of acknowledgement for call diversion according to Example 1 of the disclosure;

FIG. 14 is a structure diagram of a protocol data frame requesting for call diversion according to Example 2 of the disclosure;

FIG. 15 is a structure diagram of a protocol data frame for carrying the call diversion according to Example 2 of the disclosure; and FIG. 16 is a structure diagram of a protocol data frame of acknowledgement for call diversion according to Example 2 of the disclosure.

DETAILED DESCRIPTION

Figure 1:
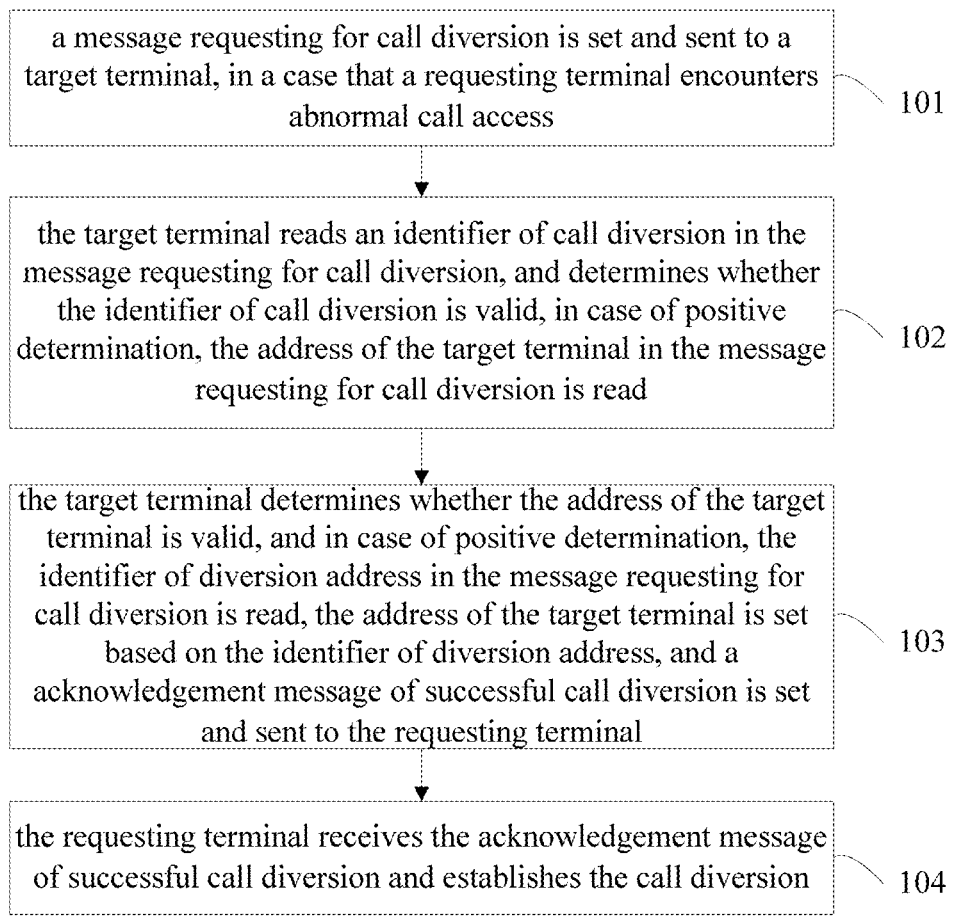
FIG. 1 is a flow chart of a method for call diversion according to a first embodiment of the disclosure.

A method, a terminal, and a system for implementing call diversion are provided according to the embodiments of the disclosure, with which call diversion may be implemented among mobile terminals without using a dispatcher station.

The method provided in the disclosure includes: setting, by a requesting terminal, a message requesting for call diversion and sending the message to a target terminal, in a case that the requesting terminal encounters abnormal call access; reading, by the target terminal, an identifier of call diversion in the message requesting for call diversion, determining whether the identifier of call diversion is valid, and in case of positive determination, reading an address of the target terminal in the message requesting for call diversion; determining, by the target terminal, whether the address of the target terminal is valid, and in case of positive determination, reading the identifier of diversion address in the message requesting for call diversion, setting the address of the diverting terminal based on the identifier of diversion address, setting a acknowledgement message of successful call diversion and sending the acknowledgement message to the requesting terminal; and receiving, by the requesting terminal, the acknowledgement message of successful call diversion, and establishing the call diversion.

The requesting terminal provided in the disclosure includes: a module for setting requesting message, configured to set the message requesting for call diversion in case of abnormal call access; a module for sending requesting message, configured to send the message requesting for call diversion to the target terminal, to allow the target terminal to read an identifier of call diversion in the message requesting for call diversion, determine whether the identifier of call diversion is valid, in case of positive determination, read an address of the target terminal in the message requesting for call diversion, determine whether the address of the target terminal is valid, in case of positive determination, read an identifier of diversion address in the message requesting of call diversion, set an address of a diverting terminal based on the identifier of diversion address, set a acknowledgement message of successful call diversion and send the acknowledgement message; a module for receiving acknowledgement message, configured to receive the acknowledgement message of successful call diversion and establish the call diversion.

The target terminal provided in the disclosure includes: a module for receiving requesting message, configured to receive the message requesting for call diversion, where the message requesting for call diversion is set and sent by the requesting terminal in a case that the requesting terminal encounters abnormal call access; a module for determining identifier of call diversion, configured to determine whether the identifier of call diversion is valid, where in case of positive determination, the address of the target terminal in the message requesting for call diversion is read; a module for determining address of target terminal, configured to determine whether the address of the target terminal is valid, where in case of positive determination, the identifier of diversion address in the message requesting for call diversion is read; a module for setting an address of a diverting terminal, configured to set the address of the diverting terminal based on the identifier of diversion address; a module for setting acknowledgement message of diversion, configured to set the acknowledgement message of successful call diversion in a case that the address of the target terminal is valid; a module for sending acknowledgement message of diversion, configured to send the acknowledgement message of successful diversion to the requesting terminal, to allow the requesting terminal to receive the acknowledgement message of successful call diversion and establish the call diversion.

The requesting terminal provided in the disclosure includes: a module for setting cancellation message, configured to set a message for canceling call diversion when recovering to normal call access; a module for sending cancellation message, configured to send the message for canceling call diversion to the target terminal, to allow the target terminal to read an identifier of diversion cancellation in the message for canceling call diversion, determine whether the identifier of diversion cancellation is valid, and in case of positive determination, read an address of a target terminal in the message for canceling call diversion, determine whether the address of the target terminal is valid, and in case of positive determination, read an identifier of address cancellation in the message for canceling call diversion, remove an address of a diverting terminal based on the identifier of address cancellation, and set and send a message of successful cancellation of call diversion; a module for receiving message of successful cancellation, configured to cancel the call diversion based on the message of successful cancellation of call diversion.

The target terminal provided in the disclosure includes: a module for receiving cancellation message, configured to receive a message for canceling call diversion, where the message for canceling call diversion is set and sent by the requesting terminal when the requesting terminal recovers to normal call access; a module for determining identifier of diversion cancellation, configured to determine whether the identifier of diversion cancellation is valid, where in case of positive determination, address of the target terminal in the message for canceling call diversion is read; a module for determining address, configured to determine whether the address of the target terminal is valid, where in case of positive determination, an identifier of cancellation address in the message for canceling call diversion is read; a module for removing, configured to remove the address of the diverting terminal based on the identifier of cancellation address; a module for setting a message of successful cancellation, configured to set the message of successful cancellation of call diversion in a case that the address of the target terminal is valid; and a module for sending message of successful cancellation, configured to send the message of successful cancellation of call diversion to the requesting terminal, to allow the requesting terminal to receive the message of successful cancellation of call diversion and cancel the call diversion.

The system provided in the disclosure includes: a requesting terminal provided in the disclosure and a target terminal provided in the disclosure.

Hereinafter the embodiments are illustrated in detail in conjunction with the drawings.

The First Embodiment

FIG. 1 is a flowchart of a method for implementing call diversion according to a first embodiment of the disclosure. The method includes steps 101-104.

In step 101, a message requesting for call diversion is set and sent to a target terminal, in a case that a requesting terminal encounters abnormal call access.

The case that the requesting terminal encounters abnormal call access includes various situations. If situations such as no service, a battery alarm, and a busy call are encountered, the requesting terminal may automatically trigger the establishment of a request for call diversion; alternatively, a user may set to establish the request for call diversion in business trip.

When encountering abnormal call access, the requesting terminal sets a message of call diversion, which includes setting a protocol data frame requesting for call diversion, and defining respective information units in the protocol data frame requesting for call diversion.

Figure 2:
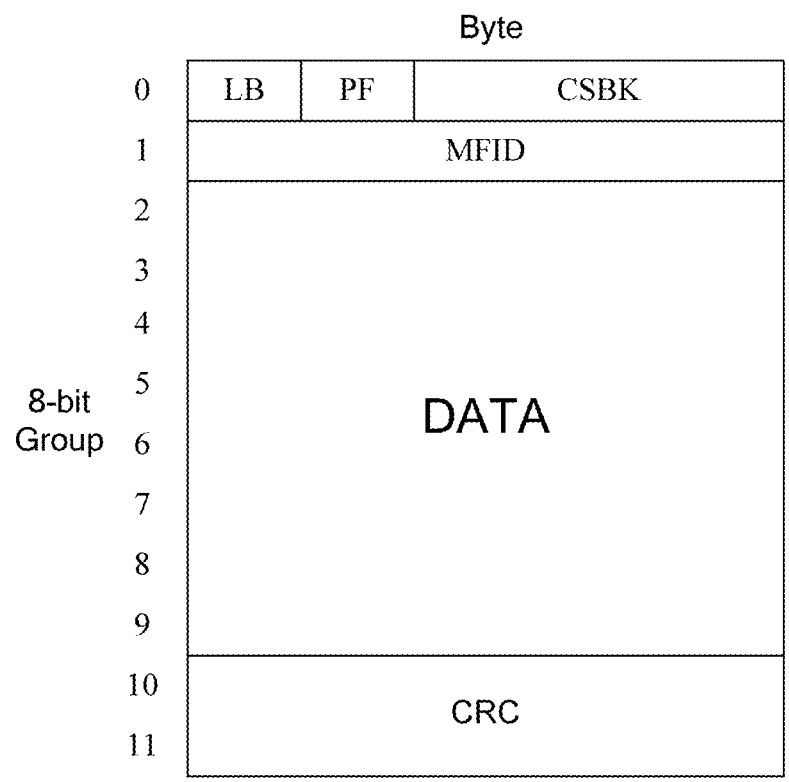
FIG. 2 is a diagram of frame structure of control signaling block defined in digital mobile radio standard in conventional technology.

A frame structure of Control Signaling Block (CSBK) is defined in Digital Mobile Radio (DMR) standard, as shown in FIG. 2. The 64-bit data from byte 2 to byte 9 may be user-defined.

FIG. 3 is a structure diagram of the protocol data frame requesting for call diversion, and the definitions of respective information units are as follows.

Table 1 shows a definition of an information unit Last_Block (LB), which is represented using a 1-bit binary code with length of 1-bit. When the value of LB is 0, it indicates a beginning or middle block among multiple control blocks; when the value of LB is 1, it indicates a single control signaling block or the last block among multiple control signaling blocks.

TABLE 1

Definition of information unit Last_Block (LB)

| Information unit | Length | Value | Label |
|---|---|---|---|
| Last_Block | 1 | 0 | The beginning or middle block among multiple control blocks |
| | | 1 | A single control signaling block or the last block among multiple control signaling blocks |

Table 2 shows the definition of information unit Protect Flag (PF), which is represented using a 1-bit binary code with length of 1-bit. When the value of PF is 0, it indicates a reserved information unit.

TABLE 2

Definition of information unit Protect Flag (PF)

| Information unit | Length | Value | Label |
|---|---|---|---|
| Protect Flag | 1 | 0 | Reserved for future use |

Table 3 shows the definition of information unit Control Signaling Block Opcode (CSBK Opcode), which is represented using a 6-bit binary code with length of 6-bit. When the value of CSBK Opcode is 110110, it indicates a control signaling operation code of the request for call diversion; when the value of CSBK Opcode is 110111, it indicates a control signaling operation code of the acknowledgement for call diversion. The control signaling operation code may be set at another value based on an actual situation, and it is not limited here.

TABLE 3

Definition of information unit Control Signaling Block Opcode (CSBK Opcode)

| Information unit | Length | Value | Label |
|---|---|---|---|
| Control Signaling Block Opcode (CSBK Opcode) | 6 | 110110 | The control signaling operation code of the request for call diversion |
| | | 110111 | The control signaling operation code of the acknowledgement for call diversion |

Table 4 shows the definition of information unit Manufacturer's Feature set ID (MFID), which is represented using an 8-bit binary code with length of 8-bit. When the value of MFID is 00000000, it indicates an identifier code of DMR standard service.

TABLE 4

Definition of Manufacturer's Feature set ID (MFID) information unit

| Information unit | Length | Value | Label |
|---|---|---|---|
| Manufacturer's Feature set ID | 8 | 00000000 | The identifier code of DMR standard service |
| | | 00000001 | Reserved for standard future application |
| | | 00000010 | Reserved for standard future application |
| | | 00000011 | Reserved for standard future application |
| | | 00000100 | Manufacturer's Feature set ID |
| | | ... | And so on |
| | | 01111111 | Manufacturer's Feature set ID |
| | | 1xxxxxxx | Reserved for future Manufacturer's Feature set ID |

Table 5 shows the definition of information unit Group or Individual (G/I), which is represented using a 1-bit binary code with length of 1-bit. When the value of G/I is 0, it indicates that the target address of calling is a single mobile station; when the value of G/I is 1, it indicates that the target address of calling is a group of mobile stations.

TABLE 5

Definition of Group or Individual (G/I) information unit

| Information unit | Length | Value | Label |
|---|---|---|---|
| Group or Individual | 1 | 0 | The target address of calling is a single mobile station |
| | | 1 | The target address of calling is a group of mobile stations |

Table 6 shows the definition of information unit Operation Code (OC) of call diversion, which is represented using a 2-bit binary code with length of 2-bit. When the value of OC is 00, it indicates the establishment operation of call diversion; when the value of OC is 01, it indicates a cancellation operation of call diversion.

TABLE 6

Definition of information unit Operation Code (OC) of call diversion

| Information unit | Length | Value | Label |
|---|---|---|---|
| Operation Code of call diversion | 2 | 00 | The establishment operation of call diversion |
| | | 01 | The cancellation operation of call diversion |
| | | 10 | Reserved for future application |
| | | 11 | Reserved for future application |

Table 7 shows the definition of information unit Number of Address (NOA), which is represented using a 4-bit binary code with length of 4-bit. When the value of NOA is 0, it indicates that the address of source terminal is the address of call diversion; when the value of NOA is any one of 1~15, it indicates the number of third-party terminals which the call diversion is performed for, and the address of the third-party terminal is the address of diverted terminal.

TABLE 7

Definition of information unit Number of Address (NOA)

| Information unit | Length | Value | Label |
|---|---|---|---|
| Number of Address | 4 | 0 | The address of source terminal is the address of call diversion |
| | | 1~15 | The number of third-party terminals which the call diversion is performed for |

Table 8 shows the definition of information unit Address, which is represented using a 24-bit binary code with length of 24-bit. When the value of Address is a number between 1~16776415, the address of requesting terminal indicates the address of initiator of call diversion; the address of target terminal indicates the address of target of call diversion, the address of diverted terminal indicates the address of call diversion of multiple users of the third-party.

TABLE 8

Definition of information unit Address

| Information unit | Length | Value | Label |
|---|---|---|---|
| Address of requesting terminal | 24 | 1~16776415 | Address of initiator of call diversion |
| Address of target terminal | 24 | 1~16776415 | Address of target of call diversion |

TABLE 8-continued

Definition of information unit Address

| Information unit | Length | Value | Label |
|---|---|---|---|
| Address of diverted terminal | 24 | 1~16776415 | address of call diversion of multiple terminals of the third-party |

When performing call diversion for at least one mobile terminal of the third-party, it requires to define a protocol data frame for carrying the message of call diversion, which includes: a protocol data unit of a middle block (as shown in FIG. 4) and a protocol data unit of a last block (as shown in FIG. 5).

Preferably, at most 6 mobile terminals may be call-forwarded to a same target terminal. In the protocol data frame for carrying the message of call diversion, the protocol data unit of the middle block carries information of the 8 Most-Significant-Bits of the address of the fourth diverted terminal; the protocol data unit of the last block carries information of the 16 Least-Significant-Bits of the address of the fourth diverted terminal.

The set message requesting for call diversion is sent to the target terminal through a conventional Time Division Multiple Access channel.

In step 102, the target terminal reads an identifier of call diversion in the message requesting for call diversion, and determines whether the identifier of call diversion is valid. In case of positive determination, the address of the target terminal in the message requesting for call diversion is read.

The identifier of call diversion read by the target terminal, is the Control Signaling operation code in the protocol frame requesting for call diversion, i.e., the value of Control Signaling Block Opcode CSBK Opcode should be 110110, based on the definition of information unit Control Signaling Block Opcode in above Table 3.

The address of target terminal, refers to the address of the target of call diversion, which is a number between 1~16776415, based on the definition of information unit Address in above Table 8.

In step 103, the target terminal determines whether the address of the target terminal is valid, and in case of positive determination, the identifier of diversion address in the message requesting for call diversion is read, the address of the target terminal is set based on the identifier of diversion address, and a acknowledgement message of successful call diversion is set and sent to the requesting terminal.

The identifier of diversion address read by the target terminal, refers to Number of Address in the protocol frame requesting for call diversion, i.e., based on the definition of information unit Number of Address, when the read value of Number of Address is 0, it indicates that the address of requesting terminal is the address of the diverting terminal, and the address of requesting terminal is read and set as the address of the diverting terminal; when the read value of Number of Address is any one of 1~15, it indicates the number of third-party terminals which the call diversion is performed for, and the address of at least one diverted terminal is read and set as the address of diverting terminal. For example, the number of address is 3, then addresses of 3 diverted terminals are read and set as the addresses of diverting terminals, and call diversion is established for the 3 terminals.

In a case that the identifier of call diversion and address of target terminal are both valid, the acknowledgement message of successful call diversion is set, i.e., respective information units in the protocol data frame of acknowledgement for call diversion are defined in detail. FIG. 6 shows a structure diagram of the protocol data frame of acknowledgement for call diversion.

The definition of information unit LB is shown in Table 1; the definition of information unit PF is shown in Table 2; the definition of information unit CSBK Opcode is shown in Table 3, i.e., the value of CSBK Opcode should be set at 110111; the definition of information unit MFID is shown in Table 4. These will not be described again here.

Table 9 shows the definition of information unit Response Code (RC), which is represented using an 8-bit binary code with length of 8-bit. When the value of RC is 0, it indicates that the target terminal permits receiving the request for call diversion, i.e., it is a acknowledgement message of successful call diversion; when the value of RC is 1, it indicates that the target terminal refuses to receive the request for call diversion, i.e., it is a acknowledgement message of unsuccessful call diversion.

TABLE 9

Definition of information unit Response Code (RC)

| Information unit | Length | Value | Label |
|---|---|---|---|
| Response Code | 8 | 00000000 | The target terminal permits receiving the request for call diversion |
| | | 00000001 | The target terminal refuses to receive the request for call diversion |

In step 104, the requesting terminal receives the acknowledgement message of successful call diversion and establishes the call diversion.

When the requesting terminal receives the acknowledgement message of successful call diversion sent by the target terminal, the requesting terminal shows that the call diversion succeeds.

It may be learned from the above that, beneficial effects of the disclosure are as follows:

In the method for call diversion provided in the disclosure, the message requesting for call diversion is set and sent to the target terminal, in a case that the requesting terminal encounters abnormal call access; the target terminal reads the identifier of call diversion in the message requesting for call diversion, determines whether the identifier of call diversion is valid, in case of positive determination, the address of the target terminal in the message requesting for call diversion is read, and the target terminal determines whether the address of the target terminal is valid, in case of positive determination, the identifier of diversion address in the message requesting for call diversion is read, the address of the diverting terminal is set based on the identifier of diversion address, the acknowledgement message of successful call diversion is set and sent to the requesting terminal, the requesting terminal receives the acknowledgement message of successful call diversion and establishes the call diversion; the requesting terminal sends the message requesting for call diversion to the target terminal directly, and after verifying the validity of the message requesting for call diversion, the target terminal sets the address of diverting terminal and the acknowledgement message of successful call diversion, sends the acknowledgement message of successful call diversion to the requesting terminal, and establishes the call diversion, where no dispatcher station is needed, and the setting of call diversion among terminals is realized on their own.

The Second Embodiment

Figure 7:
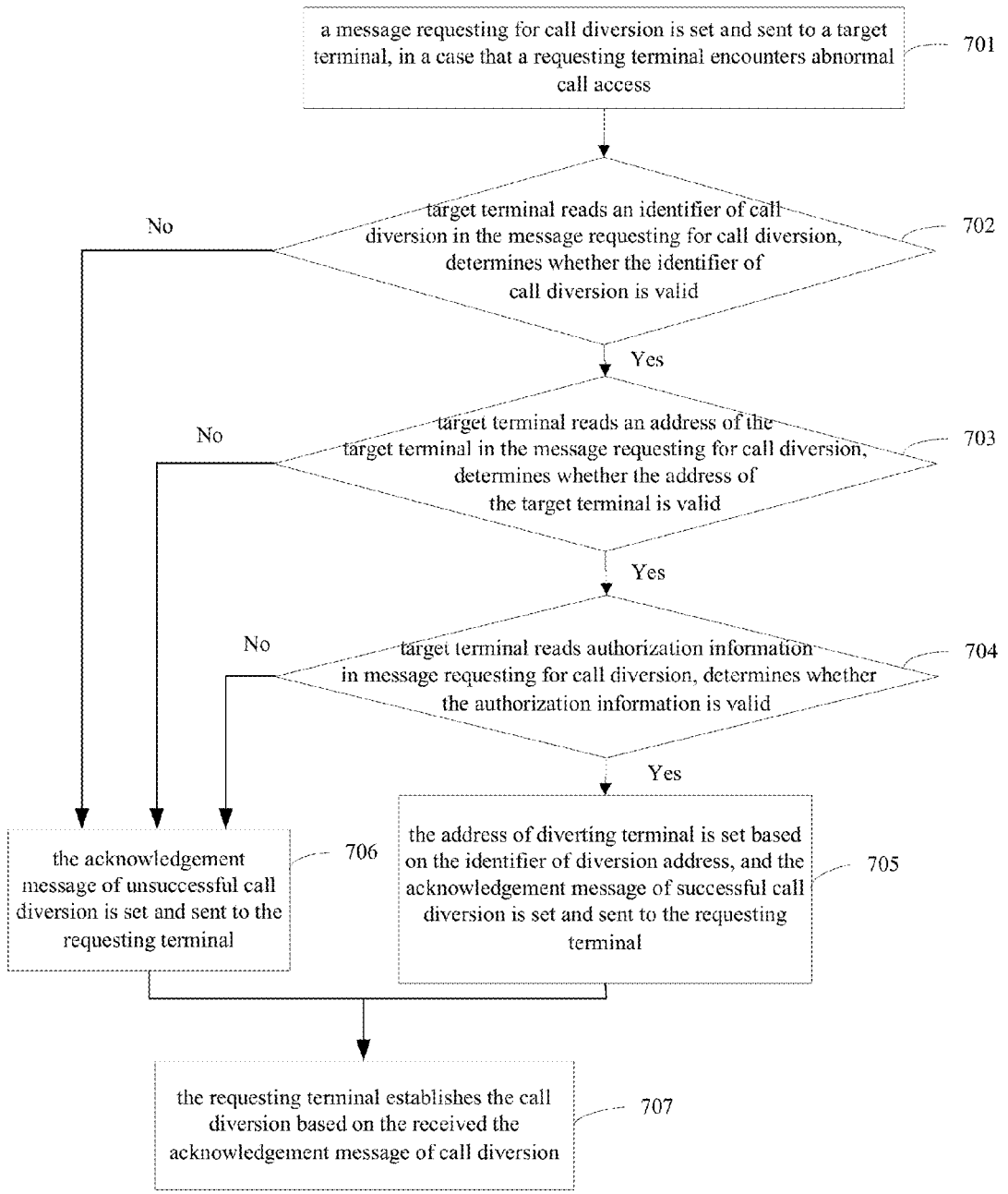
FIG. 7 is a flow chart of a method for implementing call diversion according to a second embodiment of the disclosure.

FIG. 7 shows a flow chart of a method for implementing call diversion according to a second embodiment of the disclosure. Compared to the first embodiment, the second embodiment further checks the validity of authorization information, which includes steps 701-707.

In step 701, a message requesting for call diversion is set and sent to a target terminal, in a case that a requesting terminal encounters abnormal call access.

Setting the message requesting for call diversion, refers to setting the protocol data frame requesting for call diversion. The definition of information units, including Last_Block (LB), Protect Flag (PF), Control Signaling Block Opcode (CSBK Opcode), Manufacturer's Feature set ID (MFID), Group or Individual (G/I), Operation Code of call diversion (OC), Number of Address (NOA), and Address, are described in the first embodiment, and these will not be described again here.

Table 10 shows the definition of information unit Authorization Code (AC), which is represented using an 8-bit binary code with length of 8-bit. The value of Authorization Code is a number between 0~255, representing the value of Authorization Code of call diversion. The setting of Authorization Code is user-defined based on different target terminals.

TABLE 10

Definition of information unit Authorization Code (AC)

| Information unit | Length | Value | Label |
| --- | --- | --- | --- |
| Authorization Code | 8 | 0~255 | Authorization Code of call diversion |

When the requesting terminal sends the message requesting for call diversion to the target terminal, timing is started simultaneously, and a preset threshold for timing is set based on actual requirements. In the case that no acknowledgement message of call diversion sent by the target terminal is received after the timing exceeds the preset threshold, it is determined whether the allowed number of times for resend runs out. In case of positive determination, the establishment of call diversion fails; in case of negative determination, a trigger signal is sent to trigger the resending of the message requesting for call diversion.

If the requesting terminal receives a acknowledgement message of successful call diversion returned by the target terminal within the preset threshold, it indicates that the establishment of call diversion for the requesting terminal succeeds.

If the requesting terminal receives a acknowledgement message of unsuccessful call diversion returned by the target terminal within the preset threshold, or the number of times for resending the message requesting for call diversion exceeds the preset number, it indicates that the establishment of call diversion for the requesting terminal fails.

In step 702, the target terminal reads an identifier of call diversion in the message requesting for call diversion, determines whether the identifier of call diversion is valid, and in case of positive determination, the process proceeds to step 703.

The identifier of call diversion read by the target terminal, refers to the Control Signaling operation code in the protocol frame requesting for call diversion. If the value of Control Signaling operation code is 110110, it indicates that the identifier of call diversion is valid.

In step 703, the target terminal reads an address of the target terminal in the message requesting for call diversion, determines whether the address of the target terminal is valid, and in case of positive determination, the process proceeds to step 704.

The address of the target terminal refers to the address of the receiving party of call diversion. The target terminal reads the Authorization Code in the message requesting for call diversion, which is the Authorization Code in the protocol frame requesting for call diversion.

In step 704, the target terminal reads authorization information in the message requesting for call diversion, determines whether the authorization information is valid, and in case of positive determination, the process proceeds to step 705; in case of negative determination, the process proceeds to step 706.

According to the definition of Authorization Code in Table 10, the Authorization Code is an 8-bit binary code and is a number between 0~255, in a case that the read Authorization Code matches the Authorization Code preset on the target terminal, it indicates that the Authorization Code is valid.

In step 705, the address of diverting terminal is set based on the identifier of diversion address, and the acknowledgement message of successful call diversion is set and sent to the requesting terminal.

In step 706, the acknowledgement message of unsuccessful call diversion is set and sent to the requesting terminal.

In step 707, the requesting terminal establishes the call diversion based on the received the acknowledgement message of call diversion.

If the requesting terminal receives the acknowledgement message of successful call diversion, it indicates that the establishment of call diversion succeeds.

If the requesting terminal receives the acknowledgement message of unsuccessful call diversion, it indicates that the establishment of call diversion fails.

The Third Embodiment

A method for canceling call diversion includes four steps.

In Step One, when recovering to normal call access, the requesting terminal sets a message for canceling call diversion and sends the message to the target terminal.

When the requesting terminal recovers to situations such as a normal network or sufficient electricity, the message for canceling call diversion is set and sent to the target terminal, which includes setting a protocol data frame for canceling call diversion.

The definition of information units including Last_Block (LB), Protect Flag (PF), Control Signaling Block Opcode (CSBK Opcode), Manufacturer's Feature set ID (MFID), Group or Individual (G/I), Number of Address (NOA), and Address are the same as those in the first embodiment, and will not be described again here.

The value of information unit Operation Code (OC) of call diversion should be set at 01, based on the definition of OC in Table 6.

In Step Two, the target terminal reads the identifier of diversion cancellation in the message for canceling call diversion, determines whether the identifier of diversion cancellation is valid, and in case of positive determination, address of the target terminal in the message for canceling call diversion is read.

In Step Three, the target terminal determines whether the address of the target terminal is valid, and in case of positive determination, the identifier of cancellation address in the message for canceling call diversion is read, the address of diverting terminal is removed based on the identifier of cancellation address, and a message of successful cancellation of call diversion is set and sent to the requesting terminal.

In Step Four, the requesting terminal cancels the call diversion based on the message of successful cancellation of call diversion.

Preferably, when the address of target is valid, the authorization information in the message for canceling call diversion is read, it is determined whether the authorization information is valid, and in case of positive determination, the identifier of cancellation address in the message for canceling call diversion is read, the address of diverting terminal is removed based on the identifier of cancellation address, and the message of successful cancellation of call diversion is set and sent to the requesting terminal.

The Fourth Embodiment

Figure 8:
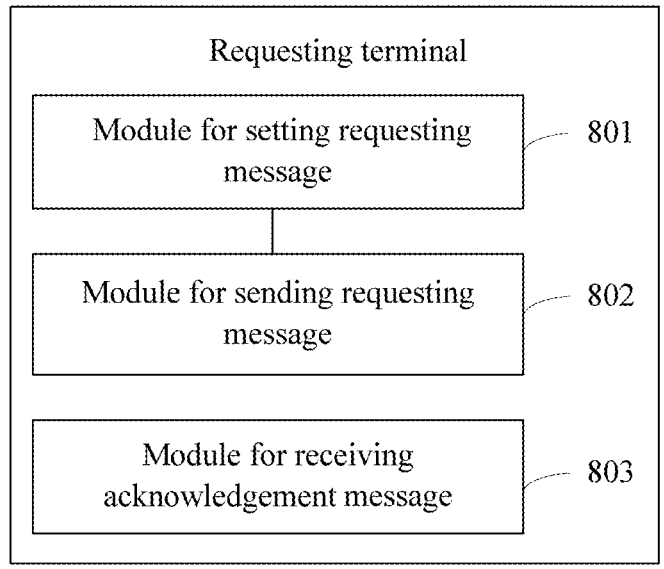
FIG. 8 is a structure diagram of a requesting terminal for implementing call diversion according to a fourth embodiment of the disclosure.

FIG. 8 shows a structure diagram of a requesting terminal for implementing call diversion according to the fourth embodiment of the disclosure. The requesting terminal includes a module for setting requesting message, a module for sending requesting message, and a module for receiving acknowledgement message.

The module 801 for setting requesting message, is configured to set a message requesting for call diversion in case of abnormal call access.

Setting the message requesting for call diversion is the same as that in the first embodiment, and is not described again here.

The module 802 for sending requesting message, is configured to send the message requesting for call diversion to the target terminal, to allow the target terminal to read an identifier of call diversion in the message requesting for call diversion, determine whether the identifier of call diversion is valid, in case of positive determination, read an address of the target terminal in the message requesting for call diversion, determine whether the address of the target terminal is valid, in case of positive determination, read an identifier of diversion address in the message requesting of call diversion, set an address of a diverting terminal based on the identifier of diversion address, set a acknowledgement message of successful call diversion and send the acknowledgement message.

The module 803 for receiving acknowledgement message, is configured to receive a acknowledgement message of successful call diversion and establish the call diversion.

Preferably, the requesting terminal for call diversion further includes a timing module.

The timing module is configured for timing after setting the message requesting for call diversion and sending the message to the target terminal. When the timing exceeds a preset threshold, a trigger signal is sent to the module for sending requesting message, where the trigger signal triggers the module for sending requesting message to resend the message requesting for call diversion.

The Fifth Embodiment

Figure 9:
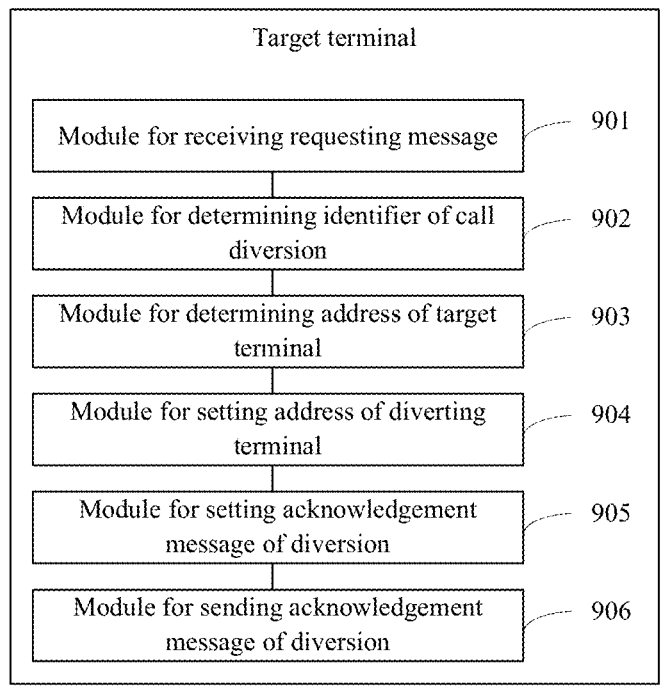
FIG. 9 is a structure diagram of a target terminal for implementing call diversion according to a fifth embodiment of the disclosure.

FIG. 9 shows a structure diagram of a target terminal for implementing call diversion according to the fifth embodiment of the disclosure. The target terminal includes a module for receiving requesting message, a module for determining identifier of call diversion, a module for determining address of target terminal, a module for setting address of diverting terminal, a module for setting acknowledgement message of diversion, and a module for sending acknowledgement message of diversion.

The module 901 for receiving requesting message, is configured to receive a message requesting for call diversion, where the message requesting for call diversion is set and sent by the requesting terminal in a case that the requesting terminal encounters abnormal call access.

The module 902 for determining identifier of call diversion, is configured to determine whether an identifier of call diversion is valid, and in case of positive determination, the address of the target terminal in the message requesting for call diversion is read.

The module 903 for determining address of target terminal, is configured to determine whether the address of the target terminal is valid, and in case of positive determination, the identifier of diversion address in the message requesting of call diversion is read.

The module 904 for setting address of diverting terminal, is configured to set the address of diverting terminal based on the identifier of diversion address.

The module 905 for setting acknowledgement message of diversion, is configured to set a acknowledgement message of successful call diversion in a case that the address of the target terminal is valid.

The module 906 for sending acknowledgement message of diversion, is configured to send the acknowledgement message of successful diversion to the requesting terminal, to allow the requesting terminal to receive the acknowledgement message of successful call diversion and establish the call diversion.

Preferably, the module for setting address of diverting terminal includes:

a first module for address reading, configured to read the address of requesting terminal in the message requesting for call diversion; and a first module for address setting, configured to set the address of requesting terminal as the address of diverting terminal;

or, a second module for address reading, configured to read the address of at least one diverted terminal in the message requesting for call diversion; and a second module for address setting, configured to set the address of the at least one diverted terminal as the address of diverting terminal.

Preferably, the target terminal further includes:

a module for determining authorization information, configured to read authorization information in the message requesting for call diversion in a case that the address of target is valid, determine whether the authorization information is valid, and in case of positive determination, set the address of diverting terminal based on the identifier of diversion address; and a module for setting acknowledgement message of diversion, configured to set the acknowledgement message of successful call diversion in a case that the authorization information is valid.

The Sixth Embodiment

Figure 10:
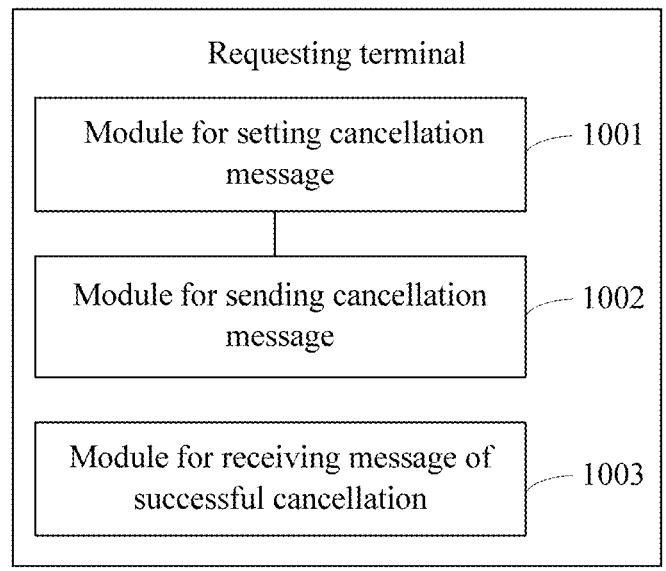
FIG. 10 is a structure diagram of a requesting terminal for implementing cancellation of call diversion according to a sixth embodiment of the disclosure.

FIG. 10 shows a structure diagram of a requesting terminal for cancellation of call diversion according to the sixth embodiment of the disclosure. The requesting terminal includes a module for setting cancellation message, a module for sending cancellation message, and a module for receiving message of successful cancellation.

The module 1001 for setting cancellation message, is configured to set a message for canceling call diversion when recovering to normal call access.

The module 1002 for sending cancellation message, is configured to send a message for canceling call diversion to a target terminal, to allow the target terminal to read an identifier of diversion cancellation in the message for canceling call diversion, determine whether the identifier of diversion cancellation is valid, and in case of positive determination, read an address of a target terminal in the message for canceling call diversion, determine whether the address of the target terminal is valid, and in case of positive determination, read an identifier of address cancellation in the message for canceling call diversion, remove an address of a diverting terminal based on the identifier of address cancellation, and set and send a message of successful cancellation of call diversion.

The module 1003 for receiving message of successful cancellation, is configured to cancel the call diversion based on the message of successful cancellation of call diversion.

The Seventh Embodiment

Figure 11:
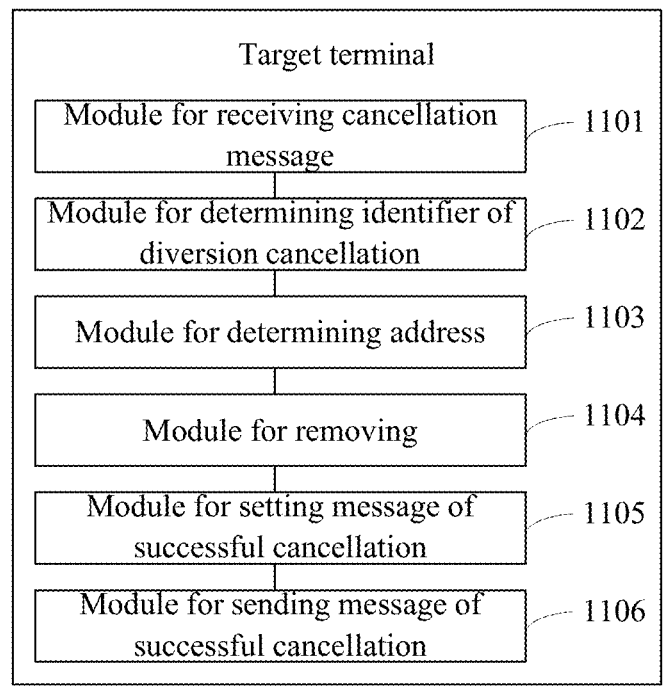
FIG. 11 is a structure diagram of a target terminal for complementing cancellation of call diversion according to a seventh embodiment of the disclosure.

FIG. 11 is a structure diagram of a target terminal for complementing cancellation of call diversion according to the seventh embodiment of the disclosure. The target terminal includes a module for receiving a cancellation message, a module for determining identifier of diversion cancellation, a module for determining address, a module for removing, a module for setting message of successful cancellation, and a module for sending message of successful cancellation.

The module 1101 for receiving cancellation message, is configured to receive a message for canceling call diversion, where the message for canceling call diversion is set and sent by the requesting terminal when the requesting terminal recovers to normal call access.

The module 1102 for determining identifier of diversion cancellation, is configured to determine whether an identifier of diversion cancellation is valid, and in case of positive determination, address of the target terminal in the message for canceling call diversion is read.

The module 1103 for determining address, is configured to determine whether the address of the target terminal is valid, and in case of positive determination, an identifier of cancellation address in the message for canceling call diversion is read.

The module 1104 for removing, is configured to remove the address of diverting terminal based on the identifier of cancellation address.

The module 1105 for setting message of successful cancellation, is configured to set the message of successful cancellation of call diversion in a case that the address of the target terminal is valid.

The module 1106 for sending message of successful cancellation, is configured to send the message of successful cancellation of call diversion to the requesting terminal, to allow the requesting terminal to receive the message of successful cancellation of call diversion and cancel the call diversion.

The Eighth Embodiment

A system for call diversion includes:
a requesting terminal provided in the disclosure and a target terminal provided in the disclosure.

The embodiments of the disclosure are illustrated in conjunction with specific application scenarios hereinafter.

In Example 1, a requesting terminal is A, and a target terminal is B. Requesting terminal A performs call diversion for itself, and the target terminal of the call diversion is B, i.e., in a case that requesting terminal A encounters abnormal access, the call is forwarded to target terminal B automatically.

If requesting terminal A encounters abnormal call in situations such as a dead battery or no service, a request for establishing call diversion is triggered. A message requesting for call diversion, i.e., the protocol data frame requesting for call diversion, is set. It may be learned from the definitions of respective information units in the protocol data frame requesting for call diversion according to the first embodiment that, Last_Block (LB) is set at 1; Protect Flag (PF) is set at 0; Control Signaling Block Opcode (CSBK Opcode) is set at 110110; Group or Individual (G/I) is set at 0, which indicates that the object establishing the call diversion is an individual; Operation Code of call diversion (OC) is set at 0, which indicates the establishment of call diversion; Number of Address (NOA) is set at 0, which indicates that the call diversion is performed for the requesting terminal itself, and Address of the requesting terminal is the Address of the diverting terminal; Authorization Code (AC) is set as an authorization code matching target terminal B; address of the requesting terminal is set as the address of terminal A; address of the target terminal is set as the address of terminal B. The protocol data frame requesting for call diversion is set as shown in FIG. 12.

After receiving the message requesting for call diversion, target terminal B determines whether an identifier of call diversion, i.e., Control Signaling Block Opcode (CSBK Opcode), is valid, and in case of positive determination, the Address of target terminal is read. It is determined whether the Address of target terminal is the address of target terminal B, and in case of positive determination, Authorization Code (AC) is read. It is determined whether Authorization Code matches target terminal B. In case of valid CSBK Opcode, valid Address of target terminal and matching Authorization Code simultaneously, the Address of diverting terminal is set to be the address of requesting terminal A, and a acknowledgement message of successful call diversion is set. Last_Block (LB) is set at 1; Protect Flag (PF) is set at 0; Control Signaling Block Opcode (CSBK Opcode) is set at 110111; Response Code is set at 0. The protocol data frame of acknowledgement for call diversion is set as shown in FIG. 13.

If CSBK Opcode is invalid, Address of target terminal is invalid, or Authorization Code does not match, a acknowledgement message of unsuccessful call diversion is set, and Response Code is set at 0.

After requesting terminal A receives the acknowledgement message of successful call diversion, the establishment of call diversion succeeds. In a case that requesting terminal A encounters abnormal access, the call is forwarded to target terminal B automatically.

In a case that requesting terminal A recovers to normal call access, a message for canceling call diversion is set. Last_Block (LB) is set at 1, Protect Flag (PF) is set at 0, Control Signaling Block Opcode (CSBK Opcode) is set at 110110, Group or Individual (G/I) is set at 0, Number of Address (NOA) is set at 0, which indicates that the cancellation of call diversion is performed for the requesting terminal itself, Authorization Code (AC) is set as an authorization code matching target terminal B; and Address of the requesting terminal is set as the address of A; Address of the target terminal is set as the address of B. Based on the definition of information unit Operation Code of call diversion (OC) in Table 6, the value of OC should be set at 0.

After receiving the message for canceling call diversion, target terminal B determines whether an identifier of diversion cancellation, i.e., Control Signaling Block Opcode (CSBK Opcode), is valid, and in case of positive determination, the Address of target terminal is read. It is determined whether Address of target terminal is the address of target terminal B, and in case of positive determination, Authorization Code (AC) is read. It is determined whether Authorization Code matches target terminal B. In case of valid CSBK Opcode, valid Address of target terminal and matching Authorization Code simultaneously, the address of diverting terminal is removed based on the identifier of cancellation address, and a message of successful cancellation of call diversion is set. Last_Block (LB) is set at 1; Protect Flag (PF) is set at 0; Control Signaling Block Opcode (CSBK Opcode) is set at 110111; Response Code is set at 0.

After requesting terminal A receives a message of successful cancellation of call diversion, the call diversion is canceled.

In Example 2, a requesting terminal is C, and a target terminal is D, requesting terminal C performs call diversion for third terminals E and F, the target terminal of call diversion is D, i.e., in a case that requesting terminals E and F encounter abnormal access, the calls are forwarded to target terminal D automatically.

Requesting terminal C sets a message requesting for call diversion, i.e., the protocol data frame requesting for call diversion and the ported data frame requesting for call diversion. When setting the protocol data frame requesting for call diversion, it may be learned from the definitions of respective information units in the protocol data frame requesting for call diversion according to the first embodiment that, Last_Block (LB) is set at 1; Protect Flag (PF) is set at 0; Control Signaling Block Opcode (CSBK Opcode) is set at 110110; Group or Individual (G/I) is set at 1, which indicates that the object establishing the call diversion is a group; Operation Code of call diversion (OC) is set at 0, which indicates the establishment of call diversion; Number of Address (NOA) is set at 2, which indicates that the call diversion is performed for two third terminals E and F, and Address of terminal E and terminal F are the Address of the diverting terminal; Authorization Code is set as an authorization code matching target terminal D; Address of the requesting terminal is set as the address of C; Address of the target terminal is set as the address of D. The protocol data frame requesting for call diversion is set as shown in FIG. 14.

When setting the protocol data frame of carrying the call diversion, Last_Block (LB) is set at 1; Protect Flag (PF) is set at 0; Control Signaling Block Opcode (CSBK Opcode) is set at 110110; Address of terminal E is set as Address of a first diverted terminal; Address of terminal F is set as Address of a second diverted terminal. The protocol data frame for carrying the call diversion is shown in FIG. 15.

After receiving the message requesting for call diversion, target terminal D determines whether an identifier of call diversion, i.e., Control Signaling Block Opcode (CSBK Opcode), is valid, and in case of positive determination, the Address of target terminal is read. It is determined whether Address of target terminal is the address of target terminal D, and in case of positive determination, Authorization Code (AC) is read. It is determined whether Authorization Code matches target terminal D. In case of valid CSBK Opcode, valid Address of target terminal and matching Authorization Code simultaneously, the addresses of terminal E and terminal F are set as the addresses of diverting terminals, and a acknowledgement message of successful call diversion is set. Last_Block (LB) is set at 1; Protect Flag (PF) is set at 0; Control Signaling Block Opcode (CSBK Opcode) is set at 110111; Response Code is set at 0. The protocol data frame of acknowledgement for call diversion is set as shown in FIG. 16.

If CSBK Opcode is invalid, Address of target terminal is invalid, or Authorization Code does not match, a acknowledgement message of unsuccessful call diversion is set, and Response Code is set at 0.

After requesting terminal C receives an acknowledgement message of successful for call diversion, the establishment of call diversion for the third-party terminal E and terminal F succeeds. In a case that terminal E and terminal F encounter abnormal access, the calls are forwarded to target terminal D automatically.

When establishing the cancellation of call diversion and setting a message for canceling call diversion, it is only required to set Operation Code of call diversion (OC) in the data protocol frame for canceling call diversion at 1, and others are set as described in the first embodiment, which is not described again here. Each mobile terminal may serve as either the requesting terminal or the target terminal, thus each mobile terminal has a function of sending the message requesting for call diversion and sending the acknowledgement message of call diversion, which is not limited.

The cancellation of call diversion in Example 2, may be the case that requesting terminal C performs cancellation of call diversion for the third-party terminal E and terminal F, or may be the case that the third-party terminal E and terminal F perform cancellation of call diversion, which is not limited here.

The mobile terminal in the disclosure may serve as either the requesting terminal or the target terminal, or serve as both the requesting terminal and the target terminal with respect to another terminal; the mobile terminal may perform either call diversion or cancellation of call diversion, or perform both call diversion and cancellation of call diversion, which is not limited here.

Preferably, the call diversion is performed for an interphone, or may be established for other mobile terminals communicating through conventional time division multiple access channel, which is not limited here.

The described embodiments are merely preferred embodiments of the disclosure, and are not intended to limit the disclosure. Any change, equivalent replacement, modification, etc., without departing from the spirit and principle of the disclosure should fall in the scope of protection of the disclosure.

What is claimed is:

1. A method for implementing call diversion, comprising:
    setting, by a requesting terminal, a message requesting for call diversion and sending the message to a target terminal, in a case that the requesting terminal encounters abnormal call access;
    reading, by the target terminal, an identifier of call diversion in the message requesting for call diversion, determining whether the identifier of call diversion is valid, and in case of positive determination, reading an address of the target terminal in the message requesting for call diversion;
    determining, by the target terminal, whether the address of the target terminal is valid, and in case of positive determination, reading an identifier of diversion address in the message requesting of call diversion, setting an address of a diverting terminal based on the identifier of diversion address, setting a acknowledgement message of successful call diversion and sending the acknowledgement message to the requesting terminal; and receiving, by the requesting terminal, the acknowledgement message of successful call diversion, and establishing the call diversion.

2. The method according to claim 1, wherein if the identifier of diversion address is an identifier of a source terminal, and the setting the address of the diverting terminal based on the identifier of diversion address comprises:

reading, by the target terminal, an address of the requesting terminal in the message requesting for call diversion; and setting the address of the requesting terminal as the address of the diverting terminal.

3. The method according to claim 1, wherein if the identifier of diversion address is an identifier of a side terminal, and the setting the address of the diverting terminal based on the identifier of diversion address comprises:

reading, by the target terminal, an address of at least one diverted terminal in the message requesting for call diversion; and setting the address of the at least one diverted terminal as the address of the diverting terminal.

4. The method according to claim 1, wherein if the address of the target terminal is valid, the method further comprises:

reading, by the target terminal, authorization information in the message requesting for call diversion, determining whether the authorization information is valid, and in case of positive determination, setting the address of the diverting terminal based on the identifier of diversion address, setting the acknowledgement message of successful call diversion and sending the acknowledgement message to the requesting terminal.

5. The method according to claim 1, wherein after setting the message requesting for call diversion and sending the message to the target terminal, the method further comprises:

timing, by the requesting terminal; and in a case that no acknowledgement message of successful call diversion is received after the timing exceeds a preset threshold, sending a trigger signal to trigger resending of the message requesting for call diversion.

6. A method for implementing cancellation of call diversion, comprising:

setting, by a requesting terminal, a message for canceling call diversion and sending the message to a target terminal, in a case that the requesting terminal recovers to normal call access;

reading, by the target terminal, an identifier of diversion cancellation in the message for canceling call diversion, determining whether the identifier of diversion cancellation is valid, and in case of positive determination, reading an address of the target terminal in the message for canceling call diversion;

determining, by the target terminal, whether the address of the target terminal is valid, in case of positive determination, reading an identifier of cancellation address in the message for canceling call diversion, removing an address of a diverting terminal based on the identifier of cancellation address, setting a message of successful cancellation of call diversion and sending the message to the requesting terminal; and canceling, by the requesting terminal, the call diversion based on the message of successful cancellation of call diversion.

7. A requesting terminal for implementing call diversion, comprising:

a module for setting requesting message, configured to set a message requesting for call diversion in case of abnormal call access;

a module for sending requesting message, configured to send the message requesting for call diversion to a target terminal, to allow the target terminal to read an identifier of call diversion in the message requesting for call diversion, determine whether the identifier of call diversion is valid, in case of positive determination, read an address of the target terminal in the message requesting for call diversion, determine whether the address of the target terminal is valid, in case of positive determination, read an identifier of diversion address in the message requesting of call diversion, set an address of a diverting terminal based on the identifier of diversion address, set a acknowledgement message of successful call diversion and send the acknowledgement message; and a module for receiving acknowledgement message, configured to receive the acknowledgement message of successful call diversion and establish the call diversion.

8. The terminal according to claim 7, further comprising:

a timing module, configured for timing after setting the message requesting for call diversion and sending the message to the target terminal; wherein after the timing exceeds the preset threshold, to send a trigger signal to the module for sending requesting message, wherein the trigger signal triggers the module for sending requesting message to resend the message requesting for call diversion.

9. A target terminal for implementing call diversion, comprising:

a module for receiving requesting message, configured to receive a message requesting for call diversion, wherein the message requesting for call diversion is set and sent by a requesting terminal in a case that the requesting terminal encounters abnormal call access;

a module for determining identifier of call diversion, configured to determine whether an identifier of call diversion is valid, wherein in case of positive determination, an address of the target terminal in the message requesting for call diversion is read;

a module for determining address of target terminal, configured to determine whether the address of the target terminal is valid, wherein in case of positive determination, an identifier of diversion address in the message requesting of call diversion is read;

a module for setting an address of a diverting terminal, configured to set the address of the diverting terminal based on the identifier of diversion address;

a module for setting acknowledgement message of diversion, configured to set a acknowledgement message of successful call diversion in a case that the address of the target terminal is valid; and a module for sending acknowledgement message of diversion, configured to send the acknowledgement message of successful diversion to the requesting terminal, to allow the requesting terminal to receive the acknowledgement message of successful call diversion and establish the call diversion.

10. The terminal according to claim 9, wherein if the identifier of diversion address is an identifier of a source terminal, the module for setting the address of the diverting terminal comprising:

a first module for address reading, configured to read an address of the requesting terminal in the message requesting for call diversion; and a first module for address setting, configured to set the address of the requesting terminal as the address of the diverting terminal.

11. The terminal according to claim 9, wherein if the identifier of diversion address is an identifier of a side terminal, the module for setting address of the diverting terminal comprising:

a second module for address reading, configured to read an address of at least one diverted terminal in the message requesting for call diversion; and a second module for address setting, configured to set the address of the at least one diverted terminal as the address of the diverting terminal.

12. The terminal according to claim 9, further comprising:

a module for determining authorization information, configured to read authorization information in the message requesting for call diversion in a case that target address is valid, determine whether the authorization information is valid, and in case of positive determination, set the address of the diverting terminal based on the identifier of diversion address; and a module for setting acknowledgement message of diversion, configured to set the acknowledgement message of successful call diversion in a case that the authorization information is valid.

13. A requesting terminal for implementing cancellation of call diversion, comprising:

a module for setting cancellation message, configured to set a message for canceling call diversion when recovering to normal call access;

a module for sending cancellation message, configured to send the message for canceling call diversion to a target terminal, to allow the target terminal to read an identifier of diversion cancellation in the message for canceling call diversion, determine whether the identifier of diversion cancellation is valid, and in case of positive determination, read an address of a target terminal in the message for canceling call diversion, determine whether the address of the target terminal is valid, and in case of positive determination, read an identifier of address cancellation in the message for canceling call diversion, remove an address of a diverting terminal based on the identifier of address cancellation, and set and send a message of successful cancellation of call diversion; and a module for receiving message of successful cancellation, configured to cancel the call diversion based on the message of successful cancellation of call diversion.

14. A target terminal for implementing cancellation of call diversion, comprising:

a module for receiving a cancellation message, configured to receive a message for canceling call diversion, wherein the message for canceling call diversion is set and sent by a requesting terminal when the requesting terminal recovers to normal call access;

a module for determining identifier of diversion cancellation, configured to determine whether the identifier of diversion cancellation is valid, wherein in case of positive determination, an address of the target terminal in the message for canceling call diversion is read;

a module for determining address, configured to determine whether the address of the target terminal is valid, wherein in case of positive determination, an identifier of cancellation address in the message for canceling call diversion is read;

a module for removing, configured to remove an address of a diverting terminal based on the identifier of cancellation address;

a module for setting a message of successful cancellation, configured to set a message of successful cancellation of call diversion in a case that the address of the target terminal is valid; and a module for sending message of successful cancellation, configured to send the message of successful cancellation of call diversion to the requesting terminal, to allow the requesting terminal to receive the message of successful cancellation of call diversion and cancel the call diversion.

* * * * *